(12) United States Patent
Bansbach et al.

(10) Patent No.: US 6,612,957 B2
(45) Date of Patent: Sep. 2, 2003

(54) HYDRAULIC SHIFT TRANSFER CASE WITH BAND BRAKE AND BI-DIRECTIONAL CLUTCH

(75) Inventors: Eric A. Bansbach, Fayetteville, NY (US); Sankar K. Mohan, DeWitt, NY (US); James S. Brissenden, Baldwinsville, NY (US)

(73) Assignee: New Venture Gear, Inc., Troy, MI (US)

( * ) Notice: Subject to any disclaimer, the term of this patent is extended or adjusted under 35 U.S.C. 154(b) by 6 days.

(21) Appl. No.: 10/107,658

(22) Filed: Mar. 27, 2002

(65) Prior Publication Data

US 2002/0142878 A1 Oct. 3, 2002

Related U.S. Application Data

(60) Provisional application No. 60/279,089, filed on Mar. 27, 2001.

(51) Int. Cl.$^7$ ............................................... F16H 37/08
(52) U.S. Cl. ....................................... 475/204; 475/320
(58) Field of Search ................................ 475/204, 318, 475/320

(56) References Cited

U.S. PATENT DOCUMENTS

| | | | |
|---|---|---|---|
| 4,063,470 A | * 12/1977 | Kelbel | 475/320 |
| 4,770,280 A | 9/1988 | Frost | |
| 4,874,056 A | 10/1989 | Naito | 180/233 |
| 4,920,828 A | * 5/1990 | Kameda et al. | 475/320 |
| 5,078,660 A | 1/1992 | Williams et al. | 475/84 |
| 5,284,068 A | 2/1994 | Frost | 74/665 GA |
| 5,323,871 A | 6/1994 | Wilson et al. | 180/197 |
| 5,346,442 A | 9/1994 | Eastman | 475/223 |
| 5,363,938 A | 11/1994 | Wilson et al. | 180/233 |
| 5,407,024 A | 4/1995 | Watson et al. | 180/248 |
| 5,411,447 A | 5/1995 | Frost | 475/233 |
| 5,582,263 A | 12/1996 | Varma et al. | 180/247 |
| 5,651,749 A | 7/1997 | Wilson et al. | 475/221 |
| 5,655,986 A | 8/1997 | Wilson et al. | 475/204 |
| 5,697,861 A | 12/1997 | Wilson | 475/198 |
| 5,700,222 A | 12/1997 | Bowen | 475/204 |
| 5,702,321 A | 12/1997 | Bakowski et al. | 475/199 |
| 5,704,863 A | 1/1998 | Zalewski et al. | 475/88 |
| 5,704,867 A | 1/1998 | Bowen | 475/221 |
| 5,836,847 A | 11/1998 | Pritchard | 475/204 |
| 5,902,205 A | 5/1999 | Williams | 475/204 |
| 5,911,644 A | 6/1999 | Williams | 475/295 |
| 5,924,510 A | 7/1999 | Itoh et al. | 180/197 |
| 5,947,858 A | 9/1999 | Williams | 475/206 |
| 5,951,428 A | 9/1999 | Itoh et al. | 475/204 |
| 5,951,429 A | 9/1999 | Eastman | 475/204 |
| 5,993,592 A | 11/1999 | Perego | |
| 6,022,289 A | 2/2000 | Francis | 475/320 |
| 6,056,666 A | 5/2000 | Williams | 475/320 |
| 6,066,065 A | 5/2000 | Breen | 475/312 |
| 6,092,635 A | 7/2000 | McCarthy et al. | 192/45 |
| 6,113,512 A | 9/2000 | Williams | 475/204 |

(List continued on next page.)

Primary Examiner—Sherry Estremsky
(74) Attorney, Agent, or Firm—Harness, Dickey & Pierce P.L.C.

(57) ABSTRACT

A two-speed full-time transfer case includes an input shaft, first and second output shafts, a planetary gearset, an interaxle differential, and first and second clutch mechanisms. The planetary gearset includes a sun gear integral with the input shaft, an annulus gear, and pinion gears rotatably mounted on a carrier and which are meshed with the sun and annulus gears. The interaxle differential has an input driven by the carrier, a first output driving the first output shaft and a second output driving a transfer mechanism coupled to the second output shaft. The first clutch mechanism is a fluid-actuated bi-directional overrunning clutch operable for selectively braking the annulus gear. The second clutch mechanism is a fluid-released bi-directional overrunning clutch for selectively releasing the input shaft from coupled engagement with the carrier.

20 Claims, 11 Drawing Sheets

U.S. PATENT DOCUMENTS

| | | | |
|---|---|---|---|
| 6,123,183 A | 9/2000 | Ito et al. | 192/220 |
| 6,132,332 A | 10/2000 | Yasui | 477/36 |
| 6,149,543 A | 11/2000 | Breen | 475/269 |
| 6,152,848 A | 11/2000 | Williams et al. | 475/204 |
| 6,186,298 B1 | 2/2001 | Wake | 192/38 |
| 6,283,887 B1 | 9/2001 | Brown et al. | 475/204 |
| 6,354,977 B1 | 3/2002 | Brown et al. | 475/204 |
| 6,367,604 B1 | 4/2002 | Kerr | 192/3.28 |
| 6,409,000 B1 | 6/2002 | Itoh et al. | 192/39 |
| 6,409,001 B1 | 6/2002 | Kerr | 192/44 |
| 6,458,056 B1 * | 10/2002 | Brown et al. | 475/204 |

* cited by examiner

HYDRAULIC SHIFT TRANSFER CASE WITH BAND BRAKE AND BI-DIRECTIONAL CLUTCH

CROSS-REFERENCE TO RELATED APPLICATIONS

This application claims the benefit of U.S. Provisional Application No. 60/279,089, filed Mar. 27, 2001.

BACKGROUND OF THE INVENTION

The present invention relates to a transfer case for controlling the distribution of drive torque between the front and rear drivelines of a four-wheel drive vehicle.

Due to increased consumer demand for four-wheel drive vehicles, a variety of different transfer cases are currently utilized for directing power (i.e. drive torque) to the front and rear drivelines of the vehicle. For example, many "part-time" transfer cases are normally operable in a two-wheel drive mode for delivering drive torque to the driven wheels. When four-wheel drive is desired, a "mode" shift mechanism can be selectively actuated by the vehicle operator for directly coupling the non-driven wheels to the driven wheels for establishing a four-wheel drive mode. As will be appreciated, motor vehicles equipped with such a part-time transfer case offer the vehicle operator the option of selectively shifting between the two-wheel drive mode during normal road conditions and the four-wheel drive mode for operation under adverse road conditions. An example of such a transfer case is disclosed in commonly-owned U.S. Pat. No. 4,770,280 to Frost.

Alternatively, it is known to use "on-demand" transfer cases for automatically directing power to the non-driven wheels, without any input or action on the part of the vehicle operator, when the traction is lost at the driven wheels. Modernly, the "on-demand" feature is incorporated into the transfer case by replacing the mode shift mechanism with a clutch assembly that is interactively associated with an electronic control system and sensor arrangement. During normal road conditions, the clutch assembly is maintained in a non-actuated condition, such that drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement. One example of such an "on-demand" transfer case is disclosed in commonly-owned U.S. Pat. No. 5,363,938 to Wilson et al, wherein the electronically-controlled clutch assembly is operable for automatically controlling the amount of drive torque transferred to the non-driven wheels as a function of the wheel speed difference (i.e. the wheel slip) between the driven and non-driven wheels.

As a further alternative, some vehicles are equipped with full-time transfer cases having an inter-axle differential that functions to permit inter-axle speed differentiation while transferring drive torque to both the front and rear drivelines. To minimize loss of traction due to wheel slippage, many full-time transfer cases are also equipped with a clutch assembly for limiting speed differentiation and biasing the torque transferred across the center differential. For example, full-time transfer cases are disclosed in commonly-owned U.S. Pat. No. 5,697,861 to Wilson and U.S. Pat. No. 5,702,321 to Bakowski et al, which are respectively equipped with mechanically-actuated and hydraulically-actuated clutch assemblies for controllably modulating the drive torque delivered across the center differential to the front and rear drivelines.

Typical transfer cases, like those discussed above, are capable of providing both low and high output drive ratios. This is generally achieved through use of a planetary gear set, the components of which are selectively engaged by a sliding dog clutch for establishing the desired ratio. Generally, the output drive ratio is selected using a range shift mechanism that is operable to move the dog clutch either manually by movement of a driver-operated shift lever or electronically at the driver's signal by a power-operated actuator. The above-referenced commonly-owned U.S. Patents illustrate two-speed transfer cases equipped with a range shift mechanism.

While the transfer cases disclosed above have advanced the technology associated with four-wheel drive motor vehicles, a need still exists to develop alternative arrangements which continue to provide improvements in packaging, response time and cost. One particular focus for improvement is the range shift mechanism.

SUMMARY OF THE INVENTION

The present invention provides an improved power transfer system for use in four-wheel drive vehicles having a two-speed transfer case equipped with a planetary gearset and a range shift system for selectively establishing low and high output drive ratios.

In accordance with one object of the present invention, a transfer case includes an input shaft, a first output shaft, a second output shaft, a planetary gearset, an interaxle differential, and a range shift system having a first clutch mechanism and a second clutch mechanism. The planetary gearset includes a sun gear driven by the input shaft, an annulus gear, and a plurality of pinion gears rotatably mounted on a carrier and meshed with the sun gear and the annulus gear. The interaxle differential has an input driven by the carrier, a first output driving the first output shaft and a second output driving a transfer mechanism coupled to the second output shaft. The first clutch mechanism is operable in a released state to permit rotation of the annulus gear and is further operable in an engaged state for braking the annulus gear. The second clutch mechanism is operable in an engaged state for coupling the input shaft for rotation with the carrier and is further operable in a released state for permitting relative rotation between the input shaft and the carrier.

As a related object of the present invention, the first clutch mechanism is a first bi-directional overrunning clutch having a first actuation member moveable between a first position and a second position. A spring normally biases the first actuation member toward its first position whereat the first bi-directional overrunning clutch is released to permit rotation of the annulus gear. A clutch actuation system is provided for selectively causing movement of the first actuation member to its second position whereat the first bi-directional overrunning clutch is engaged to prevent rotation of the annulus gear.

A further object of the present invention provides that the second clutch mechanism is a second bi-directional overrunning clutch having a second actuation member moveable between a first position and a second position. A spring normally biases the second actuation member to its first position whereat the second bi-directional overrunning clutch is engaged to prevent relative rotation between the carrier and the input shaft. The clutch actuation system is further operable for selectively causing movement of the second actuation member to its second position whereat the second bi-directional overrunning clutch is released to permit the carrier to rotate relative to the input shaft.

Yet another object of the present invention is to provide a mode clutch between the carrier and one of the first and second outputs of the interaxle differential and which is controlled by the clutch actuation system for modulating torque bias and limiting slip across the interaxle differential.

According to yet another object of the present invention, the clutch actuation system is electronically-controlled to permit "on-the-move" range shifts and selection having the vehicle operator of various available drive modes.

In accordance with an alternative embodiment of the present invention, the first clutch mechanism is substituted by a band brake disposed about the annulus gear and which can be selectively actuated to brake rotation of the annulus gear.

Further areas of applicability of the present invention will become apparent from the detailed description provided hereinafter. It should be understood that the detailed description and specific examples, while indicating preferred embodiments of the present invention, are intended for purposes of illustration only, since various changes and modifications within the spirit and scope of the invention will become apparent to those skilled in the art from this detailed description.

DETAILED DESCRIPTION OF THE INVENTION

Figure 1:
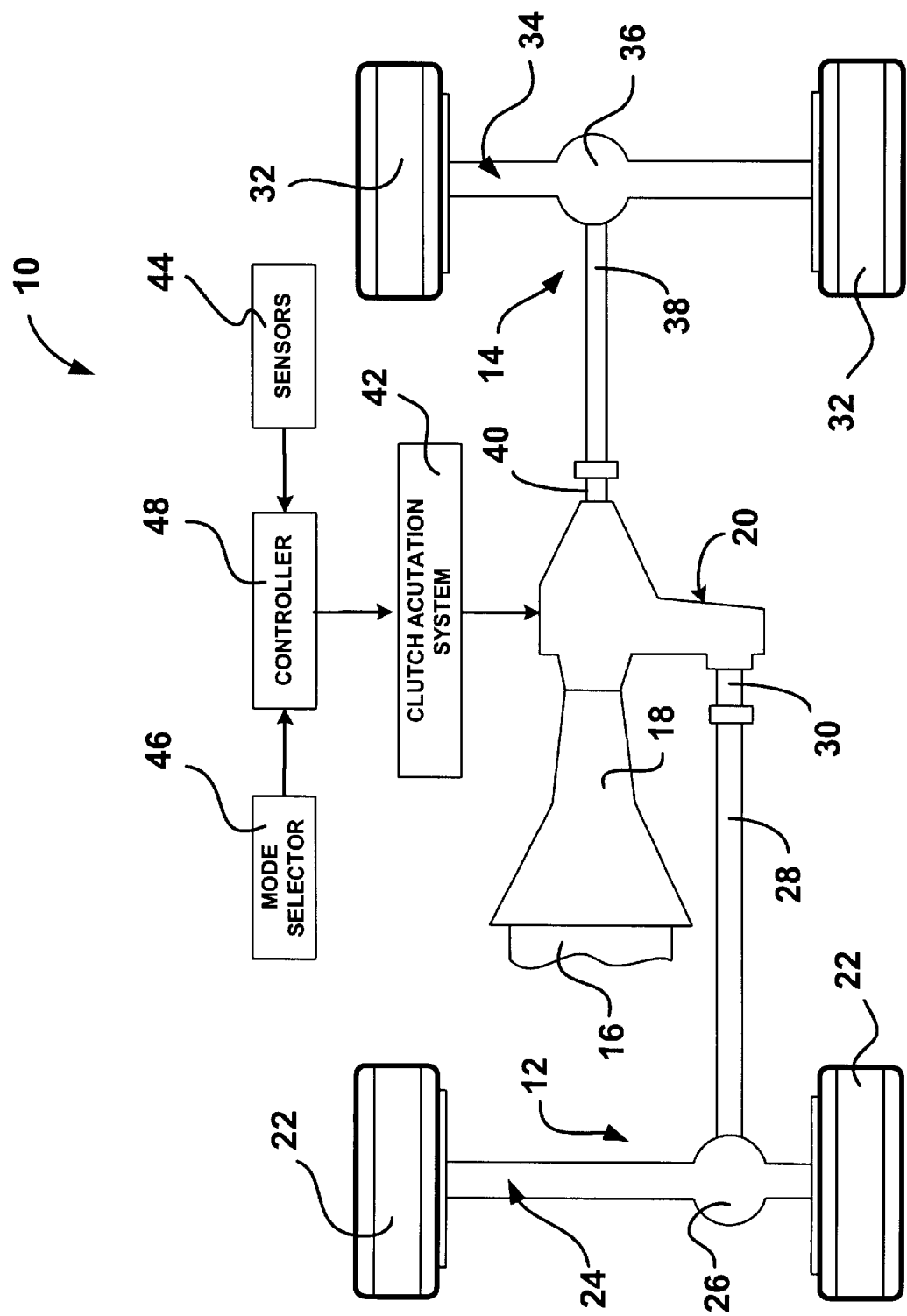
FIG. 1 is schematic view of a driveline for a four-wheel drive vehicle according to the principles of the present invention.

Referring now to FIG. 1 of the drawings, a drivetrain 10 for a four-wheel drive vehicle is schematically shown. Motor vehicle drivetrain 10 includes a front driveline 12 and a rear driveline 14 both driveable from a source of power, such as an engine 16, and a transmission 18 which may be of either the manual or automatic type. In the particular embodiment shown, drivetrain 10 includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be detailed hereinafter with greater specificity and in accordance with a first preferred embodiment of the present invention, transfer case 20 is a two-speed full-time four-wheel drive power transfer assembly equipped with a two-speed planetary gearset 50, a range shift system 52, an interaxle differential 54, and a mode clutch 56. Range shift system 52 is operable to couple components of planetary gearset 50 for driving an input member of interaxle differential 54 at either of a first (i.e. high-range) or second (i.e. low-range) speed ratio. Additionally, mode clutch 56 is operable to control the magnitude of speed differentiation and torque biasing between rear output shaft 40 and front output shaft 30. The power transfer system is further shown schematically in FIG. 1 to include a clutch actuation system 42 for controlling actuation of range shift system 52 and mode clutch 56, a group of sensors 44 for sensing certain dynamic and operational characteristics of the motor vehicle, a mode selector 46 under the control of the vehicle operator, and a controller 48 for controlling actuation of clutch actuation system 42 in response to signals from sensors 44 and mode selector 46.

Figure 2:
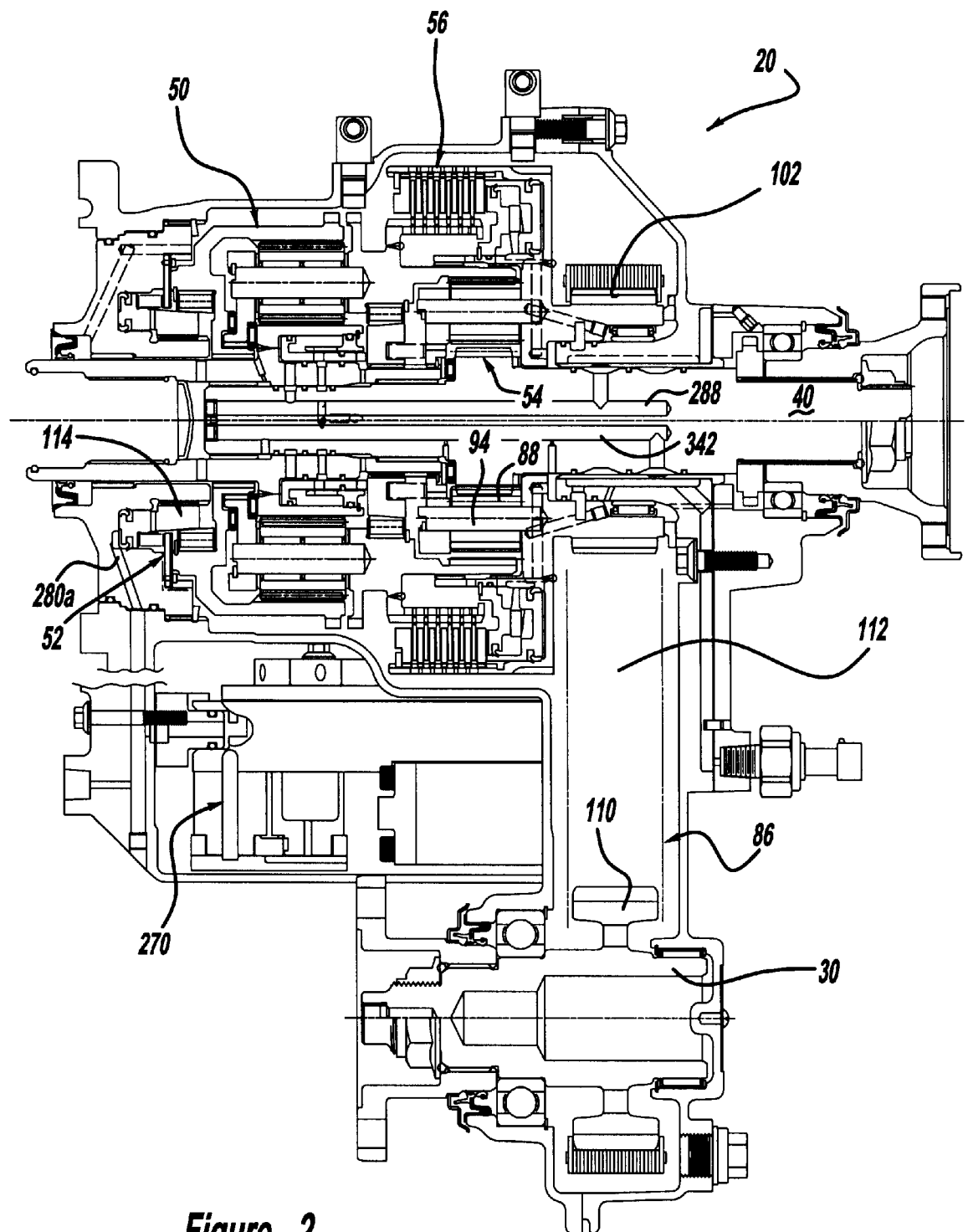
FIG. 2 is a detailed cross-section of a full-time two-speed transfer case according to the present invention.
Figure 3:
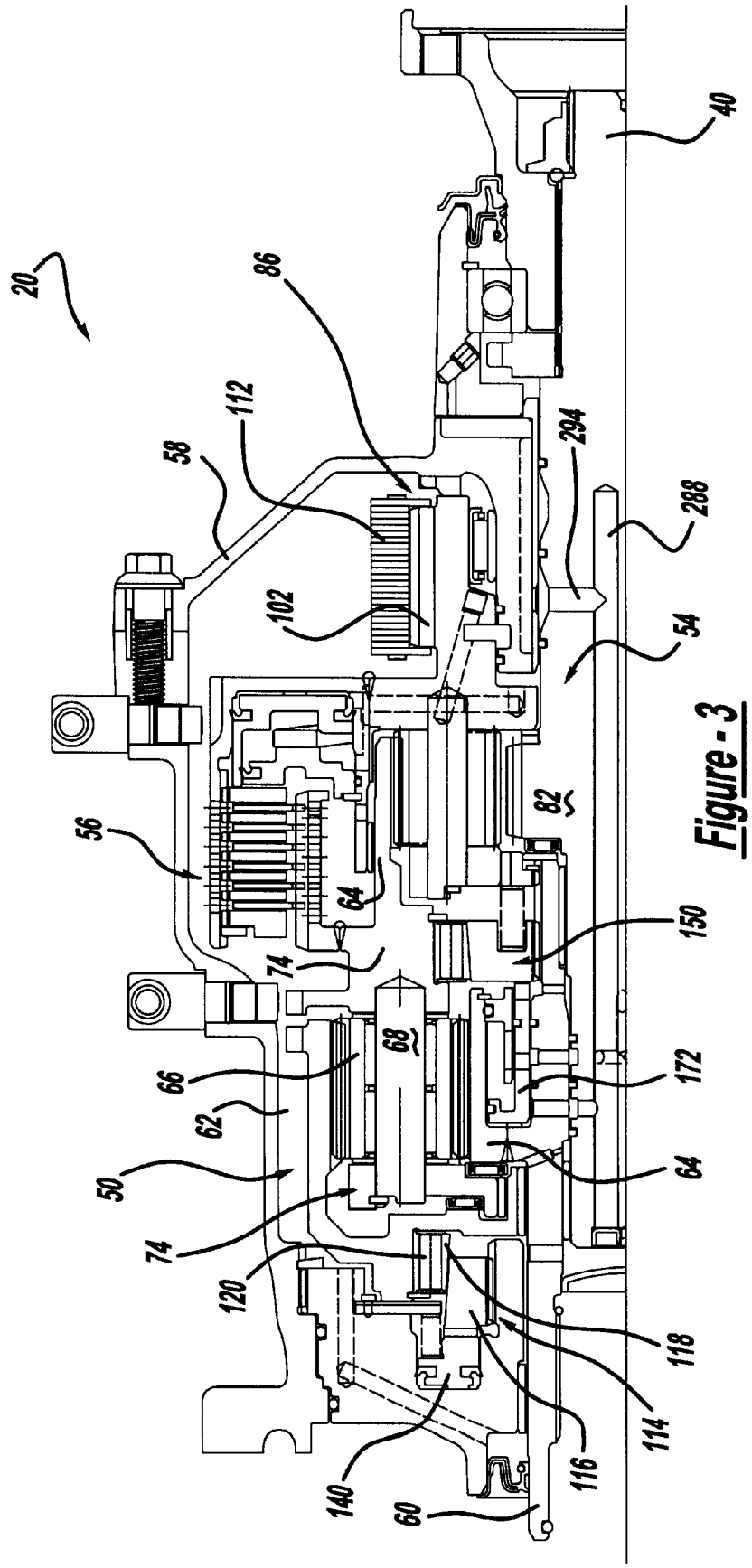
FIG. 3 is an enlarged partial view of FIG. 2.
Figure 4A:
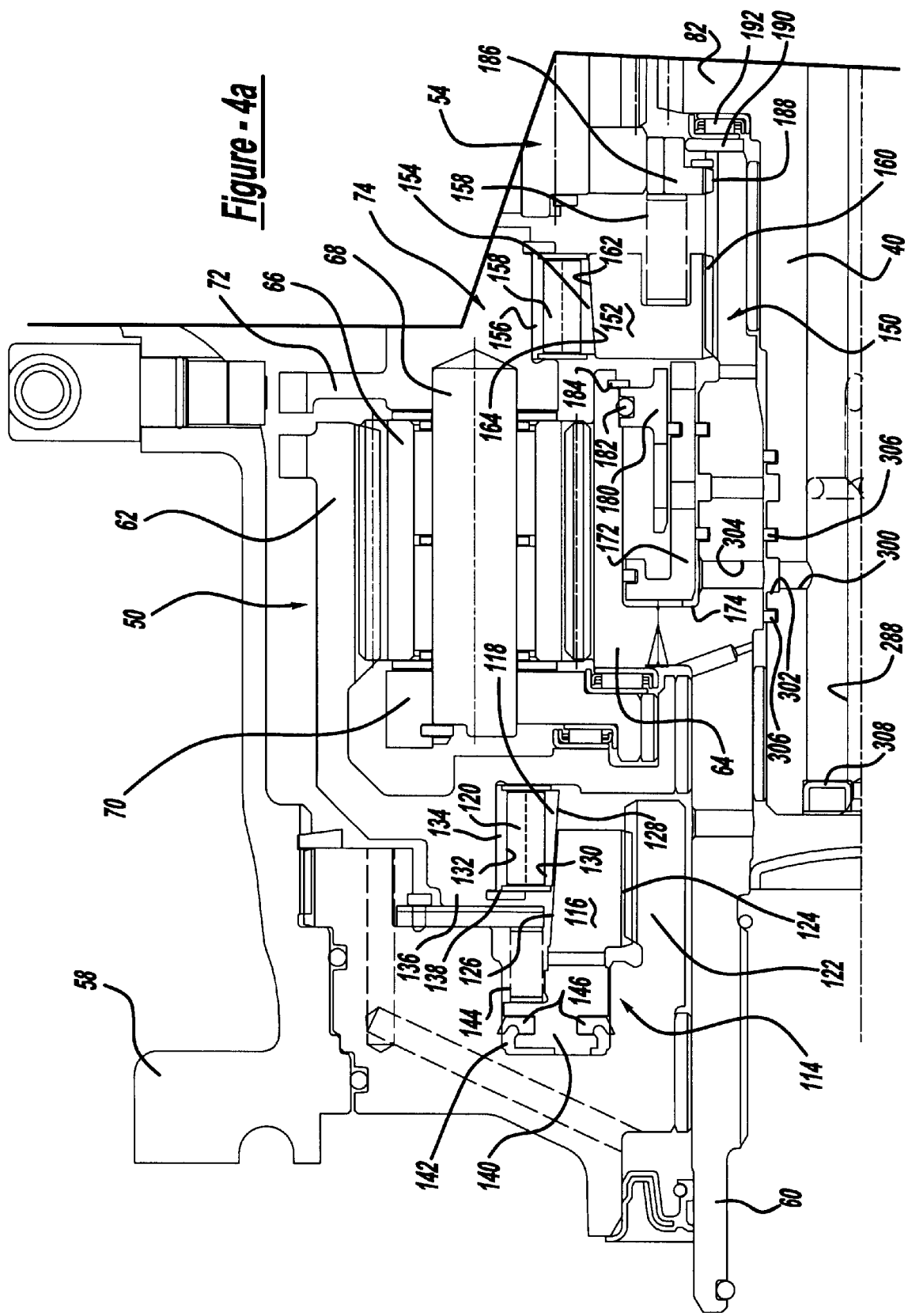
FIGS. 4A and 4B are enlarged partial views taken from FIG. 3 showing the components associated with the range shift system, the interaxle differential and the mode clutch in greater detail.

With particular reference to FIGS. 2 through 4, a preferred construction for transfer case 20 will now be described. Transfer case 20 includes a housing 58 and an input shaft 60 rotatably supported by housing 58. Input shaft 60 is adapted for connection to an output shaft (not shown) of transmission 18 which is rotatably driven by engine 16 of the motor vehicle. As seen, rear output shaft 40 is rotatably supported between input shaft 60 and housing 58, while front output shaft 30 is rotatably supported by housing 58. Planetary gearset 50 includes an annulus gear 62, a sun gear 64 fixed for rotation with input shaft 60 and a set of pinion gears 66 which are each rotatably supported on a pinion shaft 68 and meshed with sun gear 64 and annulus gear 62. Each pinion shaft 68 extends between a front carrier ring 70 and a rear carrier ring 72 which are interconnected to define a planet carrier 74. As seen, a ring gear 76 is integrally formed with rear carrier ring 72 of the planet carrier 74 and acts as the driven input to interaxle differential 54.

Planetary gearset 50 functions as a two-speed gear reduction unit which, in conjunction with range shift system 52, is operable to establish first and second drive connections between input shaft 60 and ring gear 76. To establish the first drive connection, planet carrier 74 is coupled by range shift system 52 for common rotation with input shaft 60. Thus, the first drive connection defines a high-range drive mode in which ring gear 76 is driven at a first speed ratio (i.e. direct) with respect to input shaft 60. In contrast, the second drive connection is established by range shift system 52 through braking of annulus gear 62. Thus, the second drive connection defines a low-range drive mode in which ring gear 76 is driven at a second speed ratio (i.e. reduced) relative to input shaft 60.

Interaxle differential 54 functions to permit speed differentiation and distribute drive torque between front output shaft 30 and rear output shaft 40 so as to establish a differentiated "full-time" four-wheel drive mode. As noted, ring gear 76, when driven at either of the first and second speed ratios, acts as the input to interaxle differential 54. Interaxle differential 54 also includes a planetary gearset 80 with outputs operably coupled to front output shaft 30 and rear output shaft 40. According to the particular embodiment shown, planetary gearset 80 includes a sun gear 82 fixed for rotation with rear output shaft 40, a pinion carrier 84 coupled via a transfer mechanism 86 for rotation with front output shaft 30, a first set of pinion gears 88 rotatably supported from pinion carrier 84 and meshed with sun gear 82 and a second set of pinion gears 90 rotatably supported from pinion carrier 84 and meshed with ring gear 76. Pinion gears 88 and 90 are arranged in meshed pairs and are supported on corresponding pinions posts 94 and 96, respectively, which extend between a front carrier plate 98 and a rear carrier plate 100 that are interconnected to define pinion carrier 84.

Transfer mechanism 86 includes a drive sprocket 102 rotatably supported on an annular valve body segment 104 of housing 58 by bearing assembly 106 and has a tubular hub segment 108 extending axially from rear carrier plate 100 of pinion carrier 84. Transfer mechanism 86 also includes a driven sprocket 110 that is fixed to front output shaft 30 and a power transfer device, such as a chain 112, which interconnects drive sprocket 102 to driven sprocket 110.

Range shift system 52 includes a first bi-directional overrunning clutch 114 that is operably mounted between annulus gear 62 and housing 58. First bi-directional clutch 114 is normally operable in a "released" mode to permit rotation of annulus gear 62 relative to housing 58. When required, first bi-directional clutch 114 can be selectively shifted into a "locked" mode to brake rotation of annulus gear 62. As best seen from FIG. 4A, first bi-directional clutch 114 includes an inner cone ring 116, an outer cone ring 118, and a set of load-transferring members, such as cylindrical rollers 120. Inner cone ring 116 is slidably interfaced with an annular hub segment 122 of housing 58 via a spline connection 124 and has a tapered outer conical surface 126 which interfaces with a similarly tapered inner coninical surface 128 formed on outer cone ring 118. Arcuate scallop-like cam surfaces are circumferentially formed in an outer surface 130 of outer cone ring 118. Likewise, similarly shaped cam surfaces are circumferentially formed in an inner surface 132 of a brake ring 134 that is fixed (i.e., welded) to an annular hub segment 136 of annulus gear 62. Alternatively, brake ring 134 could be eliminated with the cam surfaces formed in an inner diameter surface of hub segment 136. Rollers 120 are seated in circumferentially aligned pairs of the cam surfaces between outer cone ring 118 and brake ring 134. Rollers 120 are preferably retained by a cage (not shown) to maintain spacing therebetween,. In addition, a snap ring 138 is provided to axially retain rollers 120.

First bi-directional clutch 114 further includes a first piston 140 retained in an annular pressure chamber 142 formed in housing 58 and which is fixed to inner cone ring 116, and a spring 144 for biasing inner cone ring 116 in a first direction toward a first position. A pair of seal rings 146 provide a fluid tight seal between piston 140 and the walls of pressure chamber 142. With inner cone ring 116 in its first position, its outer conical surface 126 is released from frictional engagement with inner conical surface 128 of outer cone ring 118 so as to permit annulus gear 62 to rotate relative to housing 58. Accordingly, first bi-directional clutch 114 is operating in its released mode when inner cone ring 116 is in its first position. As will be detailed, the supply of pressurized fluid to pressure chamber 142 causes first piston 140 and inner cone ring 116 to move axially in the opposite direction toward a second position, in opposition to the biasing force of spring 144, for shifting first bi-directional clutch 114 into its locked mode. Specifically, such axial movement of inner cone ring 116 causes its outer conical surface 126 to frictionally engage inner conical surface 128 of outer cone ring 118 which, in turn, causes outer cone ring 118 to circumferentially index relative to brake ring 134. Such relative movement between outer cone ring 118 and brake ring 134 cause rollers 120 to ride up the now misaligned cam surfaces, thereby preventing outer ring 118 from rotating relative to inner ring 116. As such, annulus gear 62 is releaseably locked to hub segment 122 of housing 58 SO as to brake rotation of annulus gear 62.

Range shift system 52 further includes a second bi-directional overrunning clutch 150 that is operably mounted between input shaft 60 and carrier 74. Second bi-directional clutch 150 is normally operable in a "locked" mode to provide a direct coupling between input shaft 60 and carrier 74. When required, second bi-directional clutch 150 can be selectively shifted into a "released" mode to permit relative rotation between input shaft 60 and carrier 74. Second bi-directional clutch 150 includes an inner cone ring 152, an outer cone ring 154, a drive ring 156, and a set of cylindrical rollers 158. Inner cone ring 152 is slidably interfaced and fixed for rotation with input shaft 60 via a spline connection 160 and has a tapered outer conical surface 162 which interfaces with a similarly tapered inner conical surface 164 formed on outer cone ring 154. Arcuate cam surfaces are cifcumferentially formed in an outer surface 166 of outer cone ring 154 and are also formed in an inner surface 168 of drive ring 156. Drive ring 156 is fixed (i.e., welded, splined, etc.) for common rotation with carrier 74. Alternatively, drive ring 156 could be eliminated with its cam surfaces formed directly on an inner diameter surface of second carrier ring 72 of carrier 74. Rollers 158 are seated in circumferentially aligned pairs of the cam surfaces between outer cone ring 154 and drive ring 156 and are retained by a cage (not shown) to maintain circumferential spacing. A snap ring 170 axially locates and retains rollers 158 relative to carrier 74.

Second bi-directional clutch 150 further includes a second piston 172 which is retained in a pressure chamber 174 disposed immediately below sun gear 64, and a spring 176 which biases inner cone ring 152 in a forward direction toward a first position. Second bi-directional clutch 150 is operating in its locked mode when inner cone ring 152 is located in its first position. The supply of pressurized fluid to chamber 174 causes piston 172 to move inner cone ring 152 axially in rearward direction toward a second position, in opposition to the biasing force of spring 176, for shifting second bi-directional clutch 150 into its released mode. A separator ring 180 is sealed via a seal ring 182 relative to sun gear 64 and is further axially located by a snap ring 184. As seen, spring 176 concentrically surrounds rear output shaft 40 and its opposite ends engage an annular chamber formed in inner cone ring 152 and a spring retainer ring 186 that is fixed via a spline connection 188 for rotation with rear output shaft 40. A thrust ring 190 and a thrust bearing assembly 192 are located between the terminal end of input shaft 60 and sun gear 82 of interaxle differential 54.

In operation, one of first and second bi-directional clutches 114 and 150 are engaged while the other is disengaged to establish the first and second drive connections between input shaft 60 and carrier 74, or neither are engaged and transfer case 20 is in a "neutral" mode wherein no torque is transferred from input shaft 60 to carrier 74. First bi-directional clutch 114 is normally released due to spring 144 acting to bias inner ring 116 to its first position. As noted, engagement of first bi-directional clutch 114 is achieved via hydraulic pressure being delivered to pressure chamber 142 for moving inner race cone ring 116 to its second position. In contrast, second bi-directional clutch 150 is normally engaged via the biasing force of spring 176 acting to maintain inner cone ring 152 in its first position and is selectively disengaged by delivery of hydraulic pressure to pressure chamber 174 for moving inner cone ring 152 to its second position.

In most instances, transfer case 20 operates in a high-range drive mode such that first bi-directional clutch 114 is released and second bi-directional clutch 150 is locked. This drive mode is established without the need to supply pressurized fluid to either of pressure chambers 142 and 174 and therefore limits the service on-time requirements of clutch actuation system 42. When a low-range drive mode is selected, pressurized fluid is initially delivered to second pressure chamber 174 for causing piston 172 to move inner cone ring 152 from its first position to its second position, thereby releasing second bi-directional clutch 150 such that carrier 74 is permitted to rotate relative to input shaft 60. Thereafter, fluid pressure is delivered to first pressure chamber 142 for causing first piston 140 to move inner cone ring 116 from its first position to its second position, thereby locking first bi-directional clutch 114 such that annulus gear 62 is braked. When it is subsequently desired to return to the high-range drive mode, first pressure chamber 142 is initially vented to permit spring 120 to forcibly return inner cone ring 116 to its first position so as to release annulus gear 62. Upon release of annulus gear 62, second pressure chamber 174 is vented to permit spring 176 to forcibly urge inner ring 152 to its first position so as to couple carrier 74 to input shaft 60, thereby re-establishing the high-range drive connection.

As described previously, mode clutch 56 is interactively associated with inter-axle differential 54 to modulate speed differentiation and torque biasing between front and rear drivelines 12, 14. The rotational speeds of the respective drivelines are monitored using sensors, commonly known in the art (e.g. ABS speed sensors). Specifically, when a speed differential is seen between front and rear drivelines 12 and 14, a signal is sent from controller 48 to activate mode clutch 56 for bringing the difference in speed between the drivelines to within a pre-determined range. Referencing FIG. 4B, ring gear 76 of interaxle differential 54 is shown to include an annular hub extension 200 having a series of inner clutch plates 202 splined thereto. A clutch drum 204 is fixed (i.e., welded) to rear carrier plate 100 and has a series of outer clutch plates 206 splined thereto. Clutch plates 202 and 206 are interleaved and define a multi-plate clutch pack. Mode clutch 56 further includes a piston assembly 208 that is retained in an annular piston chamber 210 formed between inner and outer rims 212 and 214, respectively, of drum 204. Piston assembly 208 is moveable relative to the clutch pack for exerting a clutch engagement force thereon which is proportional to the fluid pressure in chamber 210.

Piston assembly 208 includes an actuator piston 216 that is sealed by inner and outer seal rings 218 relative to rims 212 and 214, a compensator piston 220, and a return spring 222. Compensator piston 220 is sealed via seal rings 224 and 226 relative to actuator piston 216 and inner rim 212 so as to define a compensator chamber 228 between actuator piston 216 and compensator piston 220. As seen, return spring 222 is located in chamber 228 and acts to bias actuation piston 216 in a rearward direction to release it from engagement with the clutch pack. A snap ring 230 limits forward movement of compensator piston 220 to prevent engagement thereof with the clutch pack. Actuator piston 216 is adapted to engage an apply plate 232 that is splined to outer rim 214 of drum 204 for frictionally compressing the clutch pack against a reaction plate 234 also splined to outer rim 214 of drum 204.

Figure 6A:
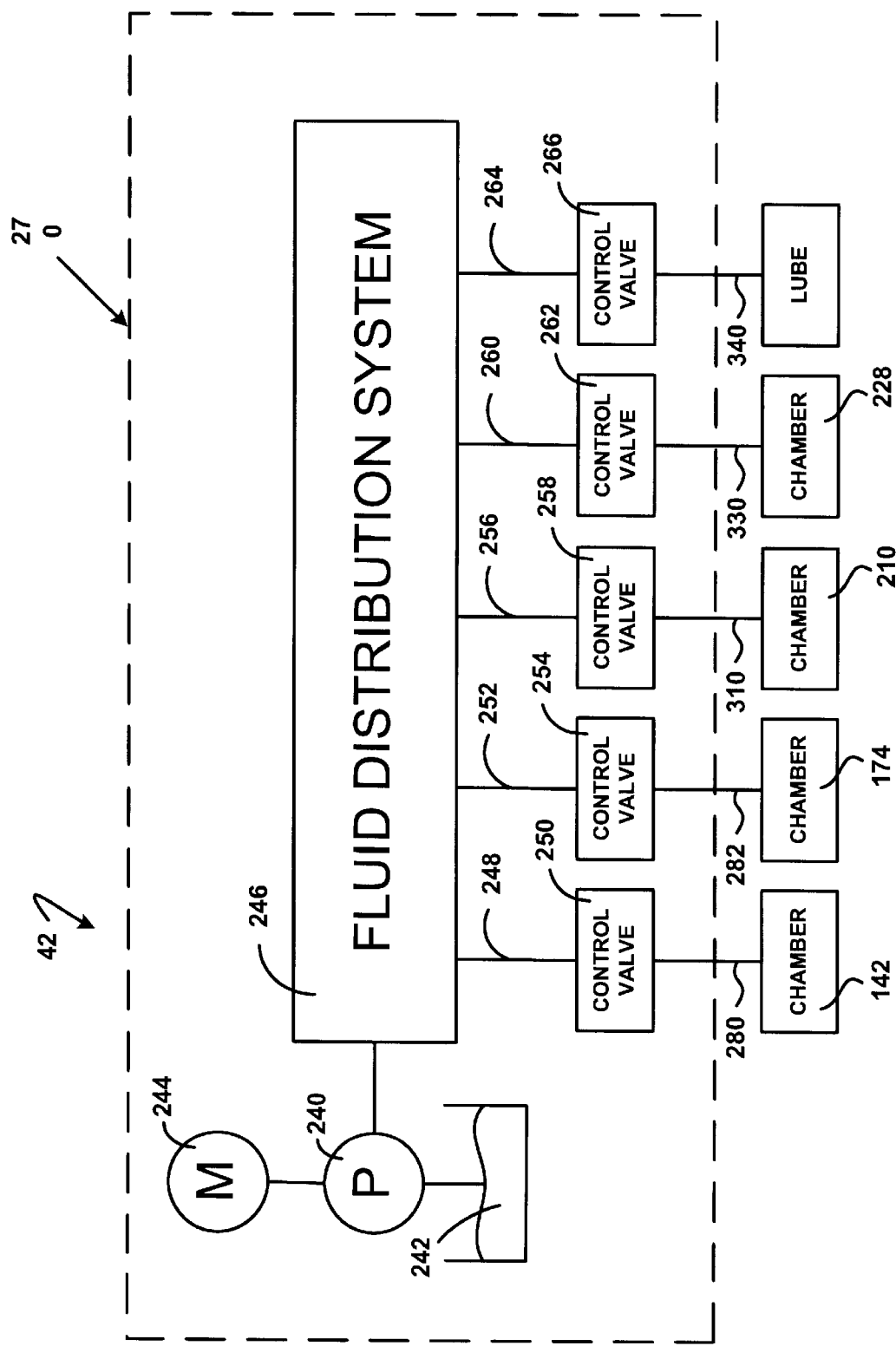
FIGS. 6A and 6B are schematic illustrations of the clutch actuation system used to control actuation of the range shift system and mode clutch.
Figure 6B:
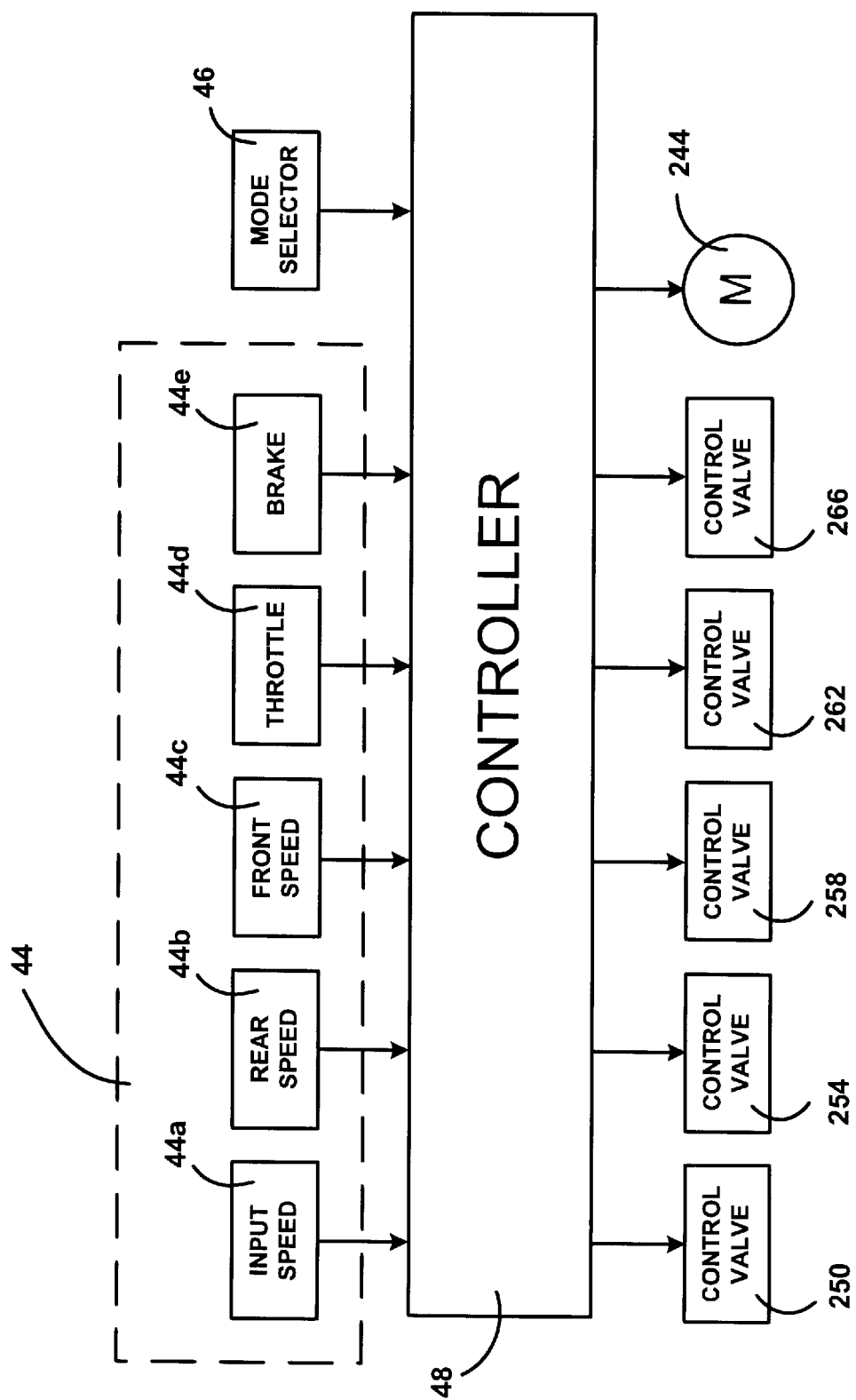

Referring to FIGS. 6A and 6B, various components of clutch actuation system 42 are schematically shown with FIG. 6A showing the hydraulic system and FIG. 6B showing the electrical system. Specifically, FIG. 6A shows clutch actuation system 42 to include a fluid pump 240 which draws fluid from an internal sump 242 within housing 58 and which is driven by an electric motor 244. The output of pump 240 is delivered to a fluid distribution system 246 which defines separate and distinct flow paths to several control valves. A first flow path 248 delivers pressurized fluid to a first control valve 250 which controls the supply/venting of fluid to/from pressure chamber 142 associated with first bi-directional clutch 114. A second flow path 252 delivers pressurized fluid to a second control valve 254 which controls the supply/venting of fluid to/from pressure chamber 174 associated with second bi-directional clutch 150. A third flow path 256 delivers fluid to a third control valve 258 which controls the supply/venting of fluid to/from pressure chamber 210 of mode clutch 56. In addition, a fourth flow path 260 delivers fluid to a fourth control valve 262 to control supply/venting of fluid to/from compensator chamber 228 of mode clutch 56. Finally, a fifth flow path 264 delivers fluid to a fifth control valve 266 provided to deliver lubricant throughout transfer case 20. Preferably, transfer case 20 is equipped with a power pack assembly 270 which integrates pump 240, motor 244, and portions of fluid distribution system 246 into a common assembly.

Referring to FIG. 6B, clutch actuation system 42 is shown to include controller 48 which receives sensor signals from several sensors 44 and a mode signal from mode selector 46. While not limited thereto, sensors 44 may include: an input speed sensor 44a detecting the rotary speed of input shaft 60; a rear shaft speed sensor 44b for detecting the rotary speed of rear output shaft 40; a front shaft speed sensor 44c for detecting the rotary speed of front output shaft 30; a throttle position sensor 44d for detecting the position of a throttle device; and a brake sensor 44e for detecting the on-off status of the brakes. Controller 48 utilizes these sensor inputs to adaptively control variable actuation of mode clutch 56. It is contemplated that any suitable control logic can be used to vary the fluid pressure in pressure chamber 210 of mode clutch 56 in response to the dynamic vehicle conditions detected by sensors 44 for limiting speed differentiation and biasing the torque distribution ratio delivered to the output shafts.

Mode selector 46 permits the vehicle operator to select between the different drive modes that are made available. These different modes can possibly include: an adaptive full-time four-wheel high-range (AUTO-H) drive mode; a locked four-wheel high-range (LOCK-H) drive mode; a neutral mode; an adaptive full-time four-wheel low-range (AUTO-L) drive mode; and a locked four-wheel low-range (LOCK-L) drive mode. As is clear, coordinated actuation of bi-directional clutches 114 and 150 establishes the high and low ranges while controlled actuation of mode clutch 56 establishes the adaptive and locked four-wheel drive modes. The term "adaptive" relates to real time control of the fluid pressure delivered to pressure chamber 210 of mode clutch 56 in response to vehicle operating conditions detected by sensors 44. In contrast, the locked mode is established by full engagement of mode clutch 56 to prevent differentiation across interaxle differential 54.

To provide means for supplying fluid from each control valve to its corresponding pressure chamber, transfer case 20 includes a series of flow pathways. A first flow pathway 280 delivers fluid from first control valve 250 to pressure chamber 142 of first bi-directional clutch. A flow passage 280a associated with first flow pathway 280 is shown in FIG. 2. Likewise, a second flow pathway 282 delivers fluid from second control valve 254 to pressure chamber 174 of second bi-directional clutch 150. Referring primarily to FIGS. 3, 4a, 4b, and 5a, second flow pathway 282 is shown to include a passage 284 which communicates with an axial channel 286 in valvebody section 104 of housing 58. Channel 286 communicates with a long axial bore 288 formed in rear output shaft 40 via one or more port 290 through a sleeve 292 surrounding rear output shaft 40 and a circumferential groove 296 and a connector passage 294 formed in rear output shaft 40. Seal rings 298, located on opposite sides of groove 296, provide a fluid tight seal between sleeve 292 and rear output shaft 40. A radial bore 300 connects axial bore 288 to a circumferential groove 302 formed in rear output shaft 40. Groove 302 communicates with one or more radial passages 304 extending through input shaft 60 which, in turn, communicate with pressure chamber 174. A pair of seal rings 306 provide a fluid tight seal between groove 302 and input shaft 60. An eng plug 308 is used to seal the open end of axial bore 288 in shaft 40.

Figure 4B:
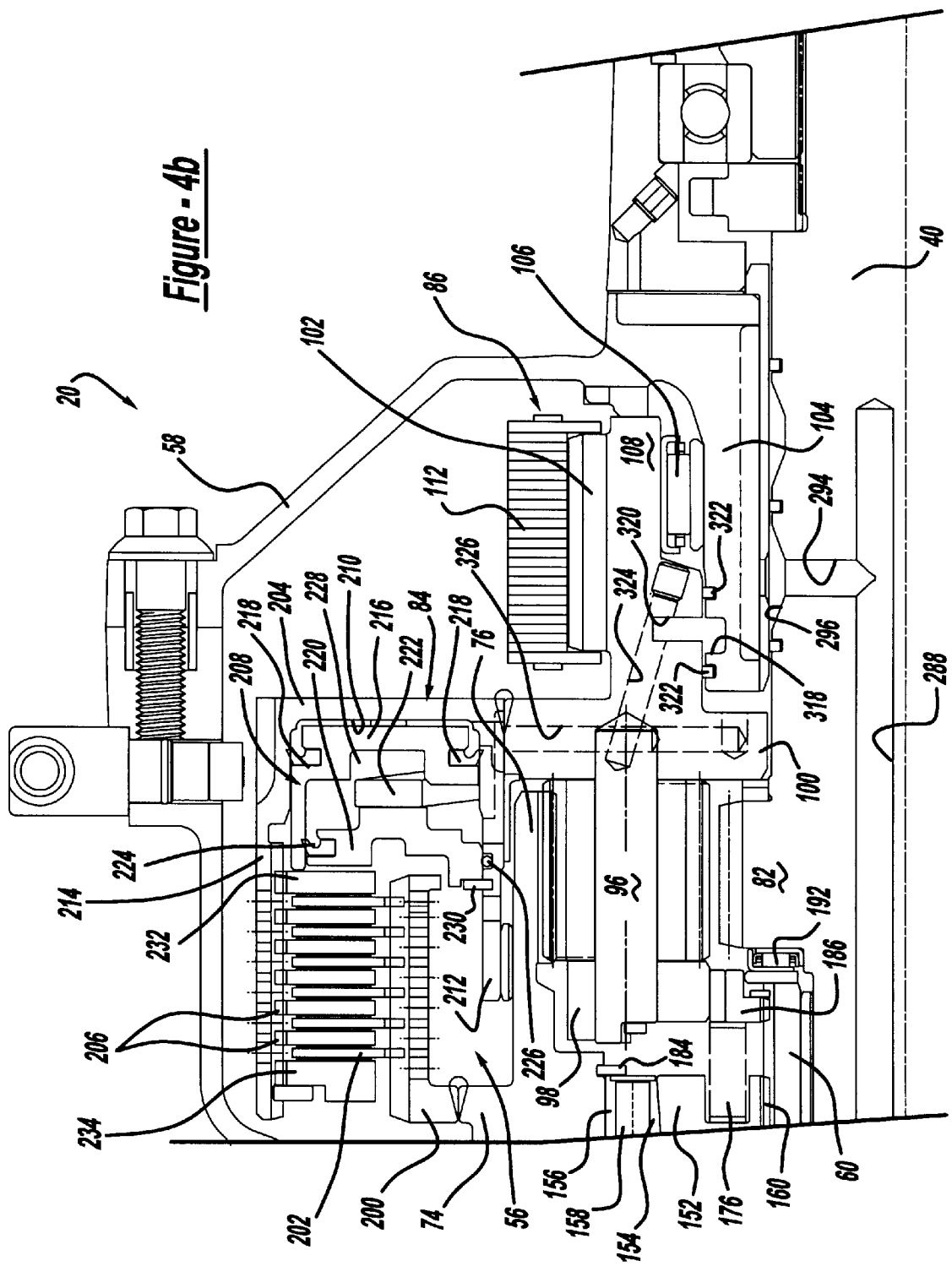
Figure 5A:
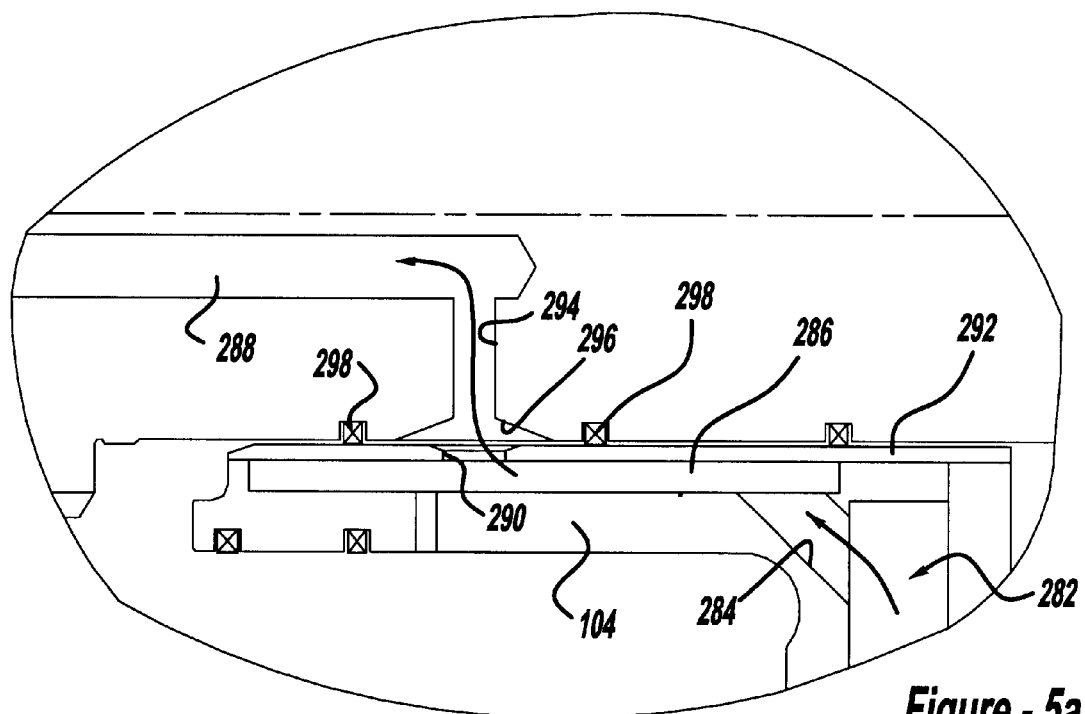
FIGS. 5A through 5D show the different flow paths for controlling actuation of the range shift system and the mode clutch.
Figure 5B:
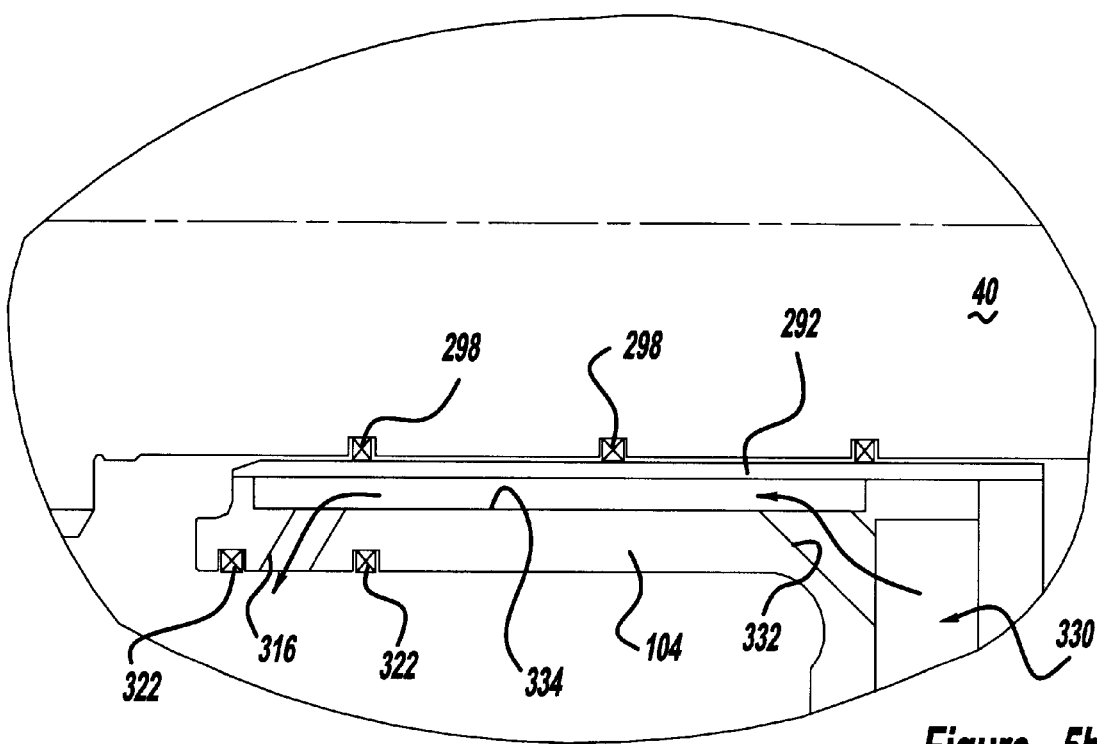

A third flow pathway 310 delivers fluid from third control valve 258 to pressure chamber 210 of mode clutch 56. Pathway 310 is shown in FIGS. 3, 4b and 5b to include a passage 312 which communicates with an axial slot or channel 314 formed in valvebody segment 104 of housing 58. An angled bore 316 provides communication between channel 314 and a circumferential groove 318 which, in turn, communicates with a passage 320 formed in extension 108 of drive sprocket 102. Seal rings 322 provide a seal between valvebody segment 104 and drive sprocket 102. Passage 320 communicates with pressure chamber 210 of mode clutch 56 via passages 324 and 326 formed in carrier ring 100.

Figure 5C:
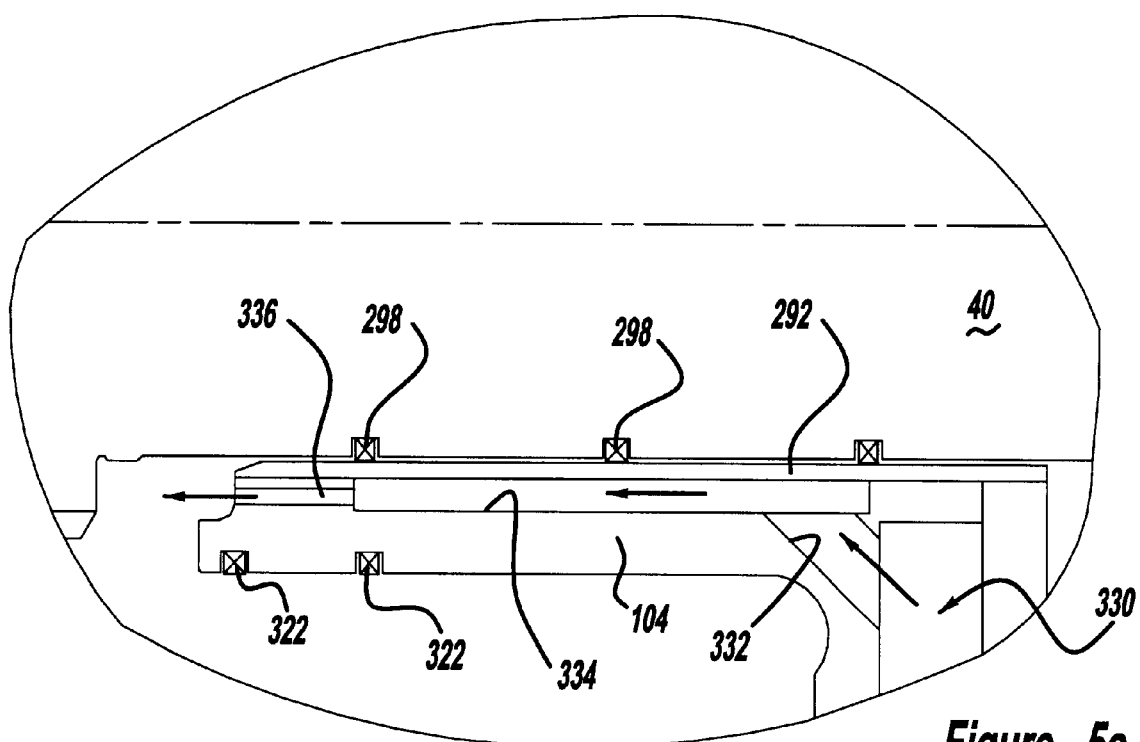
Figure 5D:
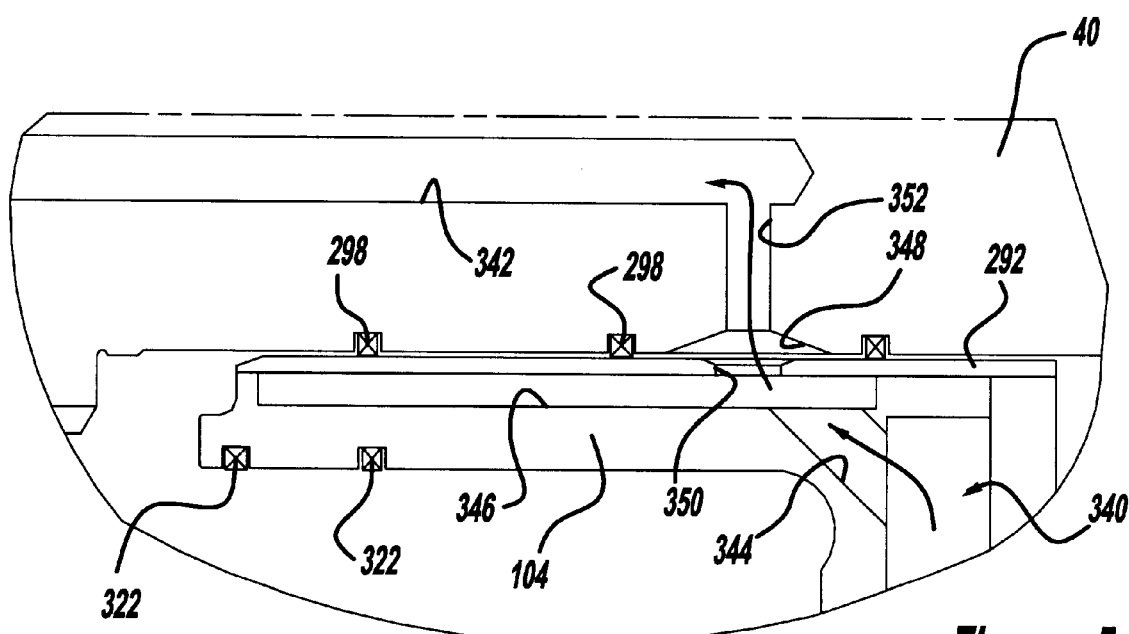

A fourth flow pathway 330 delivers fluid from fourth control valve 262 to compensator chamber 228. As shown in FIG. 5c, pathway 330 includes a passage 332 which communicates with an axial channel 334 formed in valvebody segment 104 of housing 58. A port 336 at the end of channel 334 communicates with a bore (not shown) formed in carrier ring 100 which delivers fluid to compensator chamber 228. In operation, the fluid pressure supplied to compensator chamber 228 is controlled to counter balance the cetrifugal forces acting on actuator piston 216 to ensure accurate control of mode clutch 56.

Finally, a fifth flow pathway 340 supplies fluid from fifth control valve 266 to an axial lube bore 342 formed in output shaft 40. Pathway 340 includes a passage 344 and axial channel 346 formed in valvebody segment 104 of housing which communicate with a circumferential groove 348 in shaft 40 via a port 350 through sleeve 292. Groove 348 communicates with axial bore 342 via a radial port 352. As best seen from FIG. 2, various radial lube passages are formed in output shaft 40 along its length which communicate with axial bore 342.

Figure 7:
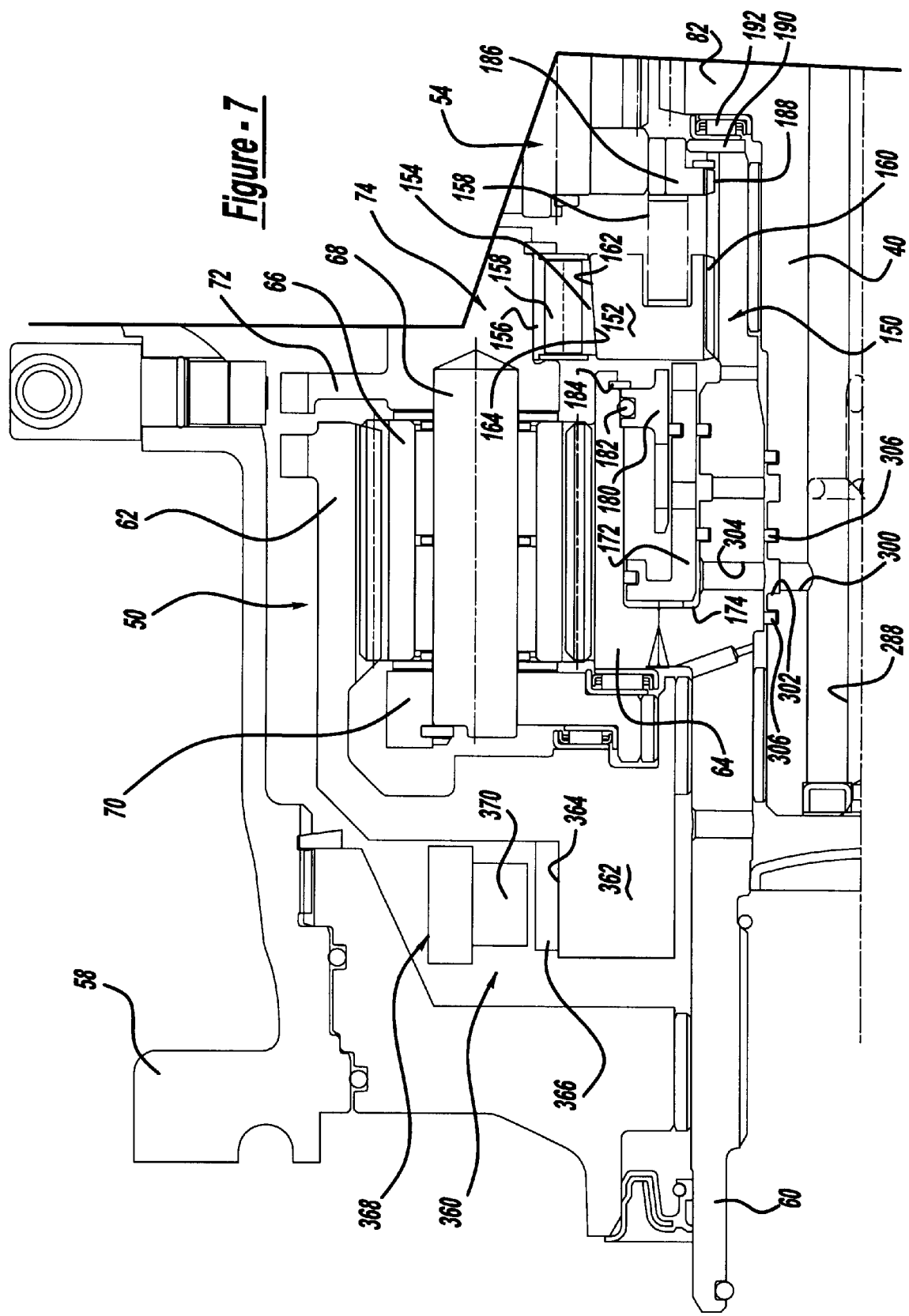
FIG. 7 is a detailed view of an alternative range shift system for use in the transfer cases of the present invention.

With reference now to FIG. 7, a second preferred embodiment of transfer case 20 shows first bi-directional clutch 114 being replaced by a band brake assembly 360. Annulus gear 62 includes an axial hub 362 having an exterior brake surface 364 which includes a plurality of brake strips 366 of a suitable clutch or brake friction material. An actuation device 368 which selectively causes a moveable caliper 370 to move in and out of engagement with brake strips 366 to control speed retardation of annulus gear 62. Actuation device 368 can be of any suitable bi-directional power operated device (i.e. motor driven linear actuator, hydraulically actuated servomotor, etc.) which controls exertion of an engagement force hub 362 of annulus gear 62. Furthermore, actuation device 368 is in communication with controller 48 which controls operation of actuation device 368.

In accordance with one control strategy, actuation device 368 is a two state (i.e. on/off) device having means for locating caliper 370 in one of two positions. In particular, brake strips 186 may be located in a first position disengaged from brake strips 366, whereby annulus gear 62 is permitted to rotate unrestricted, relative to housing 58. In contrast, caliper 370 may be positioned by actuation device 368 in a second position tightly clamped to exterior brake surface 364 so as to apply a maximum amount of braking force for braking annulus gear 62 against rotation.

In accordance with an alternative control strategy, actuation device 368 is a multi-state device having means for modulating engagement of caliper 370 with brake surface 366. The engagement modulation may vary between 0 and 100% engagement. Preferably, 0% engagement is equivalent to unrestricted rotation of annulus gear 62 and 100% is equivalent to complete braking of annulus gear 62. Within this range, rotation of annulus gear 62 may be selectively retarded.

Figure 8:
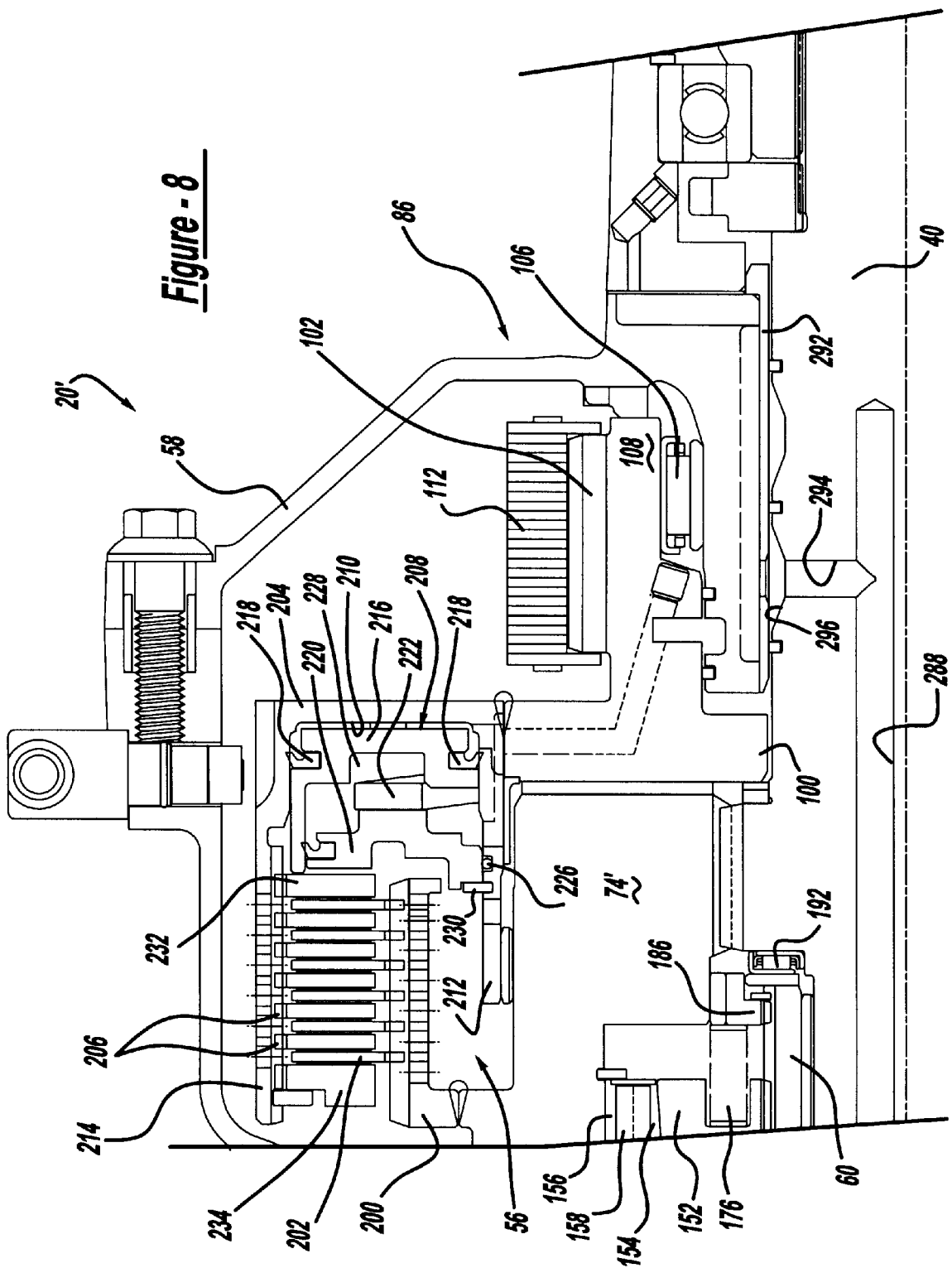
FIG. 8 is a partial view, similar to FIG. 4B, showing a elimination of the interaxle differential in an on-demand two-speed transfer case

Referring now to FIG. 8, a partial view of a modified transfer case 20' is shown which is identical to transfer case 20 except that interaxle differential 54 has been eliminated. Since FIG. 8 is generally similar to FIG. 4B with the exception of the elimination of interaxle differential 54, common reference numerals are used to identify similar components. Transfer case 20' is a two-speed on-demand power transfer assembly with mode clutch 56 arranged to transfer drive torque from carrier 74' through transfer mechanism 86 to front output shaft 30. In particular, carrier 74', which is still the driven output of planetary gearset 50 at either of the first or second (high-range and low-range) drive connection ratios, is now directly coupled via a spline connection 380 to rear output shaft 40. Thus, transfer case 20' permits establishment of either on-demand four-wheel drive and part-time four-wheel drive modes. In the on-demand modes, drive torque is normally delivered to rear driveline 14 from input shaft 60 through carrier 74' and rear output shaft 40. When vehicle conditions dictate the need to transfer some amount of drive torque to front output shaft 30, mode clutch 56 is actuated in response to the sensor signals. In the on-demand four-wheel drive mode, torque can be distributed in a range of front-to-rear ratios between 0:100 and 50:50 depending on the current vehicle operating conditions. In contrast, when a part-time four-wheel drive mode is selected, mode clutch 56 is fully engaged and maintained in this state to effectively lock rear output shaft 40 to the front output shaft 30.

The foregoing discussion discloses and describes the preferred structure and control systems for the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case comprising:

an input shaft;

first and second output shafts;

a planetary gearset having a sun gear driven by said input shaft, an annulus gear, and a set of pinion gears rotatably supported from a carrier and meshed with said annulus gear and said sun gear;

a torque transfer mechanism driven by said carrier and interconnecting said first output shaft to said second output shaft;

a first bi-directional clutch operably disposed between said annulus gear and a stationary member, said first bi-directional clutch normally operable in a released mode to permit rotation of said annulus gear and which can be selectively shifted into a locked mode to prevent rotation of said annulus gear;

a second bi-directional clutch operably disposed between said input shaft and said carrier, said second bi-directional clutch normally operable in a locked mode to couple said carrier for rotation with said input shaft and which can be selectively shifted into a released mode for permitting said carrier to rotate relative to said carrier to said input shaft; and a clutch actuation mechanism for controlling coordinated actuation of said first and second bi-directional clutches.

2. The transfer case of claim 1 wherein said first bi-directional clutch comprises;

a first ring splined for sliding movement on said stationary member between a first position and a second position and having a first tapered surface;

a second ring supported by said annulus gear and having a second tapered surface oriented to frictionally engage said first tapered surface of said first ring in response to movement of said first ring from its first position toward its second position;

a return spring for normally biasing said first ring toward its first position;

a third ring fixed to said annulus gear; and load transfer members disposed between said second and third rings for braking rotation of said annulus gear in response to movement of said first ring to its second position.

3. The transfer case of claim 2 wherein said first bi-directional clutch further includes a first piston fixed to said first ring and disposed in a first pressure chamber, and wherein said clutch actuation mechanism includes hydraulic actuator means for supplying hydraulic fluid to said first pressure chamber for moving said first ring from its first position to its second position.

4. The transfer case of claim 3 wherein said second bi-directional clutch comprises:

a first ring splined for sliding movement on said input shaft between a first position and a second position and having a first tapered surface;

a second ring supported by said carrier and having a second tapered surface oriented to frictionally engage said first tapered surface of said first ring in response to movement of said first ring from its first position toward its second position;

a return spring for normally biasing said first ring toward its first position;

a third ring fixed to said carrier; and load transferring members disposed between said second and third rings for coupling said carrier to said input shaft in response to movement of said first ring to its second position.

5. The transfer case of claim 4 wherein said second bi-directional clutch further includes a second piston fixed to said first ring and disposed in a second pressure chamber, and wherein said clutch actuation mechanism includes second hydraulic actuator means for supplying hydraulic fluid to said second pressure chamber for moving said first ring from its first position to its second position.

6. The transfer case of claim 1 wherein said torque transfer mechanism comprises an interaxle differential having an input driven by said carrier, a first output driving said first output shaft, and a second output driving said second output shaft.

7. The transfer case of claim 6 wherein said input is a ring gear driven by said carrier, said first output is a second sun gear driving said first output shaft, said second output is a second carrier driving said second output shaft, said interaxle differential further including pinion gears supported by said second carrier and interconnecting said ring gear to said second sun gear.

8. The transfer case of claim 6 wherein said torque transfer mechanism further comprises a friction clutch assembly operably disposed between said input and one of said first and second outputs of said interaxle differential, and said clutch actuation mechanism includes means for controlling modulated engagement of said friction clutch assembly.

9. The transfer case of claim 1 wherein said torque transfer mechanism includes a friction clutch assembly operably disposed between said carrier and said second output shaft, and said clutch actuation mechanism includes means for controlling modulated engagement of said friction clutch assembly.

10. A transfer case comprising:

an input shaft;

first and second output shafts;

a planetary gearset having a sun gear driven by said input shaft, an annulus gear, and a set of pinion gears rotatably supported from a carrier and meshed with said annulus gear and said sun gear;

a torque transfer mechanism driven by said carrier and interconnecting said first output shaft to said second output shaft;

a first bi-directional clutch operably disposed between said annulus gear and a stationary member, said first bi-directional clutch including a first ring splined for sliding movement on said stationary member between a first position and a second position and having a first tapered surface, a second ring supported by said annulus gear and having a second tapered surface oriented to frictionally engage said first tapered surface of said first ring in response to movement of said first ring from its first position toward its second position, a return spring for normally biasing said first ring toward its first position, and load transfer members disposed between said second ring and said annulus gear for braking rotation of said annulus gear in response to movement of said first ring to its second position;

a second bi-directional clutch operably disposed between said input shaft and said carrier, said second bi-directional clutch including a first ring splined for sliding movement on said input shaft between a first position and a second position and having a first tapered surface, a second ring supported by said carrier and having a second tapered surface oriented to frictionally engage said first tapered surface of said first ring in response to movement of said first ring from its first position toward its second position, a return spring for normally biasing said first ring toward its first position, and load transferring members disposed between said second ring and said carrier for coupling said carrier to said input shaft in response to movement of said first ring to its second position; and a clutch actuation mechanism for controlling coordinated actuation of said first and second bi-directional clutches.

11. The transfer case of 10 wherein said first bi-directional clutch further includes a first piston fixed to said first ring and disposed in a first pressure chamber, and wherein said clutch actuation mechanism includes hydraulic actuator means for supplying hydraulic fluid to said first pressure chamber for moving said first ring from its first position to its second position.

12. The transfer case of claim 11 wherein said second bi-directional clutch further includes a second piston fixed to said first ring and disposed in a second pressure chamber, and wherein said clutch actuation mechanism includes second hydraulic actuator means for supplying hydraulic fluid to said second pressure chamber for moving said first ring from its first position to its second position.

13. The transfer case of claim 10 wherein said torque transfer mechanism comprises an interaxle differential having an input driven by said carrier, a first output driving said first output shaft, and a second output driving said second output shaft.

14. The transfer case of claim 13 wherein said input is a ring gear driven by said carrier, said first output is a second sun gear driving said first output shaft, said second output is a second carrier driving said second output shaft, said interaxle differential further including pinion gears supported by said second carrier and interconnecting said ring gear to said second sun gear.

15. The transfer case of claim 14 wherein said torque transfer mechanism a friction clutch assembly operably disposed between said carrier and one of said first and second outputs, and said clutch actuation mechanism includes means for controlling modulated engagement of said friction clutch assembly.

16. The transfer case of claim 10 wherein said torque transfer mechanism further comprises a friction clutch assembly operably disposed between said carrier and said second output shaft, and said clutch actuation mechanism includes means for controlling modulated engagement of said friction clutch assembly.

17. A transfer case comprising:

an input shaft;

first and second output shafts;

a planetary gearset having a sun gear driven by said input shaft, an annulus gear, and a set of pinion gears rotatably supported from a carrier and meshed with said annulus gear and said sun gear;

a torque transfer mechanism driven by said carrier and interconnecting said first output shaft to said second output shaft;

a brake mechanism operably disposed between said annulus gear and a stationary member, said brake mechanism normally operable in a released mode to permit rotation of said annulus gear and which can be selectively shifted into a locked mode to prevent rotation of said annulus gear;

a bi-directional clutch operably disposed between said input shaft and said carrier, said bi-directional clutch normally operable in a locked mode to couple said carrier for rotation with said input shaft and which can be selectively shifted into a released mode for permitting said carrier to rotate relative to said carrier to said input shaft; and an actuation mechanism for controlling coordinated actuation of said brake mechanism and said bi-directional clutch.

18. The transfer case of claim 17 wherein said bi-directional clutch comprises:

a first ring splined for sliding movement on said input shaft between a first position and a second position and having a first tapered surface;

a second ring supported by said carrier and having a second tapered surface oriented to frictionally engage said first tapered surface of said first ring in response to movement of said first ring from its first position toward its second position;

a return spring for normally biasing said first ring toward its first position;

a third ring fixed to said carrier; and load transferring members disposed between said second and third rings for coupling said carrier to said input shaft in response to movement of said first ring to its second position.

19. The transfer case of claim 18 wherein said bi-directional clutch further includes a piston fixed to said first ring and disposed in a pressure chamber, and wherein said clutch actuation mechanism includes second hydraulic actuator means for supplying hydraulic fluid to said pressure chamber for moving said first ring from its first position to its second position.

20. The transfer case of claim 17 wherein said brake mechanism includes a caliper moveable between a first position displaced from engagement with a brake surface on said annulus gear and a second position engaged with said brake surface.

* * * * *